(12) United States Patent
Fujikura et al.

(10) Patent No.: US 6,172,696 B1
(45) Date of Patent: *Jan. 9, 2001

(54) IMAGE FORMING APPARATUS HAVING PHOTOSENSITIVE DRUM DRIVEN BY STEPPING MOTOR

(75) Inventors: Teruhiko Fujikura, Aichi-Ken; Toshikazu Higashi, Toyokawa; Tomonobu Tamura, Aichi-Ken; Akira Takasu, Toyokawa, all of (JP)

(73) Assignee: Minolta Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/186,068

(22) Filed: Nov. 5, 1998

(30) Foreign Application Priority Data

Nov. 6, 1997 (JP) ...................................... 9-303901

(51) Int. Cl.⁷ ............................. B41J 2/385; G01D 15/06; G03G 15/01
(52) U.S. Cl. ......................... 347/115; 347/129; 347/232; 399/167
(58) Field of Search ..................................... 347/115, 116, 347/119, 129, 232; 399/167, 88, 51

(56) References Cited

U.S. PATENT DOCUMENTS 5,991,576 * 11/1999 Lee ....................................... 399/167

FOREIGN PATENT DOCUMENTS

| | | |
|---|---|---|
| 4-16966 | 1/1992 | (JP) . |
| 4-34444 | 2/1992 | (JP) . |
| 6-149137 | 5/1994 | (JP) . |
| 6-186239 | 7/1994 | (JP) . |

* cited by examiner

*Primary Examiner*—Susan S. Y. Lee
(74) *Attorney, Agent, or Firm*—McDermott, Will & Emery (57) ABSTRACT

A rotational shaft of a photosensitive drum is connected to a rotational shaft of a stepping motor by a coupling, so that the stepping motor directly drives the photosensitive drum. Here, $\theta$ (°) indicating a step angle of the stepping motor, p (mm) indicating a distance between scanning lines on the photosensitive drum, $\pi$ indicating the circular constant, and d (mm) indicating a diameter of the photosensitive drum are set so as to satisfy an equation $n \cdot \theta = (360 \cdot p)/(\pi \cdot d)$ to make an optical unit scan the photosensitive drum by one scanning line every time the photosensitive drum is made to rotate n steps, n being a positive integer.

12 Claims, 5 Drawing Sheets

IMAGE FORMING APPARATUS HAVING PHOTOSENSITIVE DRUM DRIVEN BY STEPPING MOTOR

This application is based on an application No. 9-303901 filed in Japan, the content of which is hereby incorporated by reference.

BACKGROUND OF THE INVENTION

(1) Field of the Invention

The present invention relates to an image forming apparatus, and especially relates to an image forming apparatus provided with a photosensitive drum which is driven by a stepping motor.

(2) Related Art

In an electrophotographic type image forming apparatus, a toner image is formed on a photosensitive drum and the toner image is transferred onto a recording sheet to form an image. To transfer the toner image formed on the photosensitive drum onto the recording sheet with fidelity, a circumferential speed of the photosensitive drum needs to be precisely equal to a transportation speed of the recording sheet. For this reason, in recent years, a stepping motor is used as a driving source of the photosensitive drum for its high performance in braking in comparison with other kinds of motors.

As one example of conventional image forming apparatuses, Japanese Laid-Open Patent Application No. 4-34444 discloses an image forming apparatus which includes a photosensitive drum driven by a stepping motor whose rotational speed is decreased to 1/129 via a reducer composed of pulleys and a belt. Using this conventional image forming apparatus, one scanning line of the electrostatic latent image is formed on the surface of the photosensitive drum every time the stepping motor rotates four steps.

However, with the construction of the conventional image forming apparatus, rotation of the stepping motor is not reliably transmitted to the photosensitive drum due to problems such as the belt skidding on the pulleys or expansion and contraction of the belt. This leads to nonuniformity in rotation of the photosensitive drum and in the distances between the scanning lines, and so causes inconsistency in the print density on the reproduced image.

To address this problem, the photosensitive drum can be directly driven by a stepping motor. However, using the cited image forming apparatus, about 32 scanning lines (obtained by calculating an equation 129/4) of the electrostatic latent image are formed every time the stepping motor rotates one step. As known in general, the rotational speed of the stepping motor during one step is not uniform. Consequently, the distances between the 32 lines are not uniform, and so causes inconsistency in the print density on a reproduced image.

SUMMARY OF THE INVENTION

The object of the present invention is to provide an image forming apparatus, with distances between scanning lines being almost uniform.

The object of the present invention can be achieved by an image forming apparatus made up of: a photosensitive drum; a stepping motor for directly driving and rotating the photosensitive drum; and an optical unit for scanning the photosensitive drum, which is rotated by the stepping motor, one scanning line at a time using an optical beam to form a latent image on the photosensitive drum, wherein $\theta$ (°) indicating a step angle of the stepping motor, p (mm) indicating a distance between scanning lines on the photosensitive drum, and d (mm) indicating a diameter of the photosensitive drum are set so as to satisfy a following equation to make the optical unit scan the photosensitive drum by one scanning line every time the photosensitive drum is rotated n steps by the stepping motor, n being a positive integer: $n \cdot \theta = (360 \cdot p)/(\pi \cdot d)$.

With this construction, the photosensitive drum is scanned by one scanning line every time the photosensitive drum is rotated n steps, so that the distances between the scanning lines are kept almost uniform. This prevents inconsistency in the print density on a reproduced image caused by the nonuniformity in the distances between the scanning lines.

The object of the present invention can be also achieved by an image forming apparatus made up of: an image holding member which is rotatable; a driving source which is directly connected to a rotational shaft of the image holding member to rotationally drive the image holding member; and an optical unit for scanning the image holding member, which is rotated by the driving source, one scanning line at a time using an optical beam to form a latent image on the image holding member, wherein $\theta$ (°) indicating a unit moving angle of the driving source, p (mm) indicating a distance between scanning lines on the image holding member, and d (mm) indicating a diameter of the image holding member are set so as to satisfy a following equation to make the optical unit scan the image holding member by one scanning line every time the image holding member is rotated in units of n by the driving source, n being a positive integer: $n \cdot \theta = (360 \cdot p)/(\pi \cdot d)$.

With this construction, the image holding component is scanned by one scanning line every time the image holding component is rotated $n \cdot \theta$ degrees, so that the distances between the scanning lines are kept almost uniform. This prevents inconsistency in the density on a reproduced image caused by the nonuniformity in the distances between the scanning lines.

BRIEF DESCRIPTION OF THE DRAWINGS

These and other objects, advantages and features of the invention will become apparent from the following description thereof taken in conjunction with the accompanying drawings which illustrate a specific embodiment of the invention.

In the drawings.

DESCRIPTION OF PREFERRED EMBODIMENTS

The following is a description of an embodiment of the image forming apparatus of the present invention. In the embodiment, a digital color copying machine (referred to as the "copier" hereinafter) is used as an example of such image forming apparatus.

Figure 1:
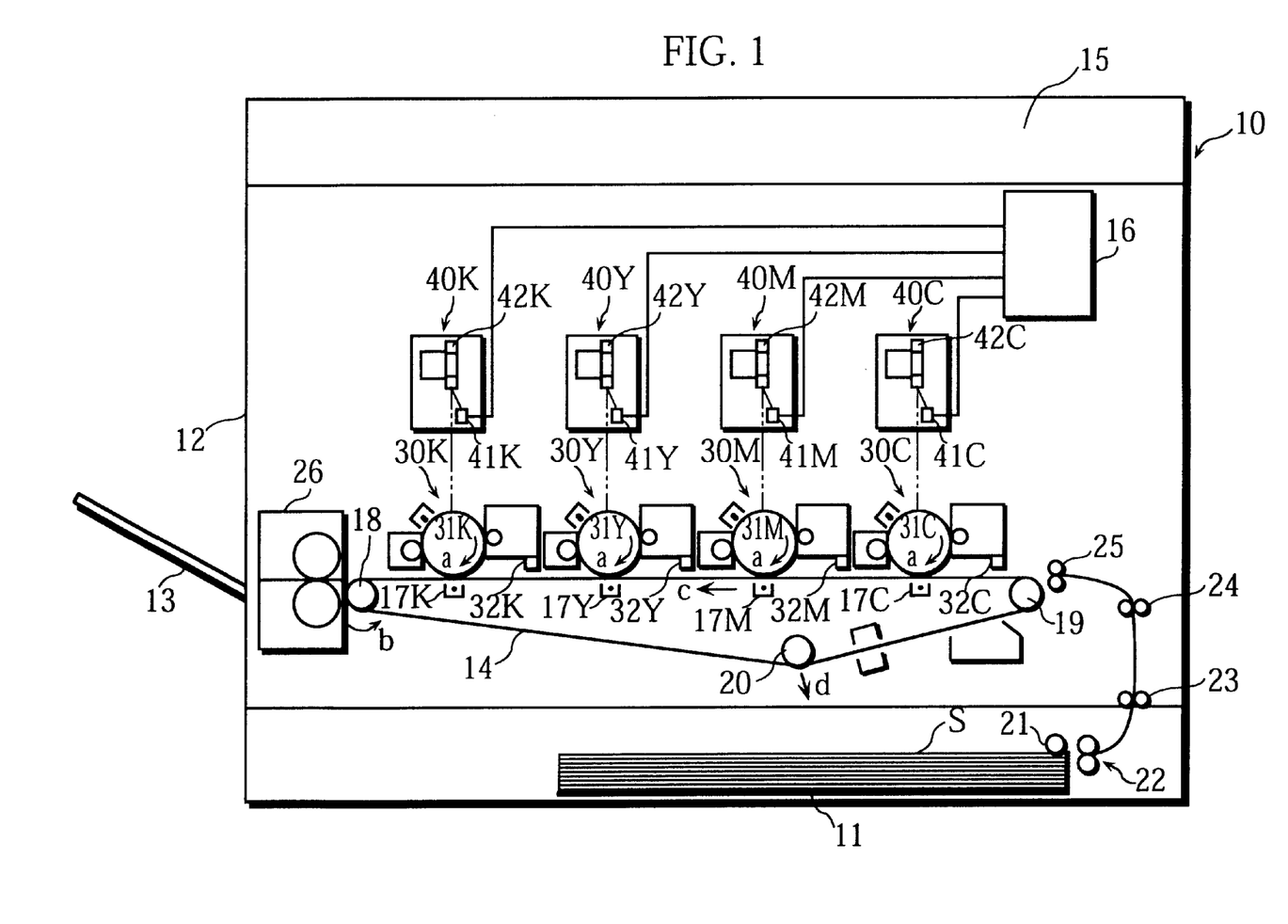
FIG. 1 shows an overall construction of a copying machine used in an embodiment of the present invention.

FIG. 1 shows a front view of the copier. This copier is a so-called "tandem-type" copier. A paper feeding cassette 11 is set at the lowermost part of an enclosure 10 and can be freely slid in and out of the copier. A paper discharge tray 13 is set on a left-side wall 12 and protrudes outward. A transport belt 14 is horizontally set in a lower space above the paper feeding cassette 11. A plurality (four in FIG. 1) of image forming units 30C, 30M, 30Y, and 30K are set above the transport belt 14 along its length. The transport belt 14 transports a recording sheet S, and the image forming units 30C to 30K sequentially transfer toner images for respective colors onto the recording sheet S, the toner images being superimposed on the recording sheet S, to form a color image.

An image reading unit 15 is set at the upper part of the enclosure 10, and optically reads image data of an original document. An image processing unit 16 performs the necessary processes on this read image data, and separates the image data into each color component, Cyan (C), Magenta (M), Yellow (Y), and Black (K). Laser diodes 41C to 41K of optical units 40C to 40K respectively set above the image forming units 30C to 30K are driven to perform light modulation in accordance with the image data for respective colors. Light-modulated laser beams are respectively deflected by polygon mirrors 42C to 42K in the main scanning direction and brought into the image forming units 30C to 30K corresponding to the respective colors.

The image forming units 30C to 30K respectively have unit constructions including photosensitive drums 31C to 31K as main components, chargers, and developing units. By means of these unit constructions, images are formed using an electrostatic copying method. More specifically, the light-modulated laser beams respectively scan the photosensitive drums 31C to 31K which are rotated in the direction of the arrows a, and electrostatic latent images formed through the scanning on the photosensitive drums 31C to 31K are visibly developed into toner images by the developing units. Note that toners C, M, Y, and K corresponding to the light-modulated colors of the optical units 40C to 40K are respectively supplied to the photosensitive drums 31C to 31K by the corresponding developing units of the image forming units 30C to 30K.

Transfer chargers 17C to 17K are set underneath the transport belt 14 at transfer positions located directly under the photosensitive drums 31C to 31K. Using the transfer chargers 17C to 17K, the toner images formed on the photosensitive drums 31C to 31K are sequentially transferred onto the recording sheet S.

The transport belt 14 runs over a driving roller 18, a slave roller 19, and a tension roller 20. The driving roller 18 is driven by a motor (not shown) and rotated in the direction of the arrow b. Together with the rotation of the driving roller 18, the transport belt 14 moves in the direction of the arrow c. Here, the rotational speed of the motor is controlled so that the moving speed of the transport belt 14 is equal to the circumferential speed of each photosensitive drum 31C to 31K when image formation is performed (this circumferential speed of the photosensitive drum is referred to as the "process speed" hereinafter). The tension roller 20 is energized in the direction of the arrow d by a tensile spring (not shown) and keeps the tension of the transport belt 14 constant.

Resist sensors 32C to 32K are respectively set before the photosensitive drums 31C to 31K in the transport direction of the recording sheet S as shown in FIG. 1, and detect the leading edge of the recording sheet S which is transported on the transport belt 14. Each resist sensor 32C to 32K is set so that a distance between the detection position of the resist sensor and the transfer position of the corresponding photosensitive drum is longer than a circumferential distance of the photosensitive drum between the emitting position of the laser beam and the transfer position measured in the rotational direction of the photosensitive drum.

Figure 2A:
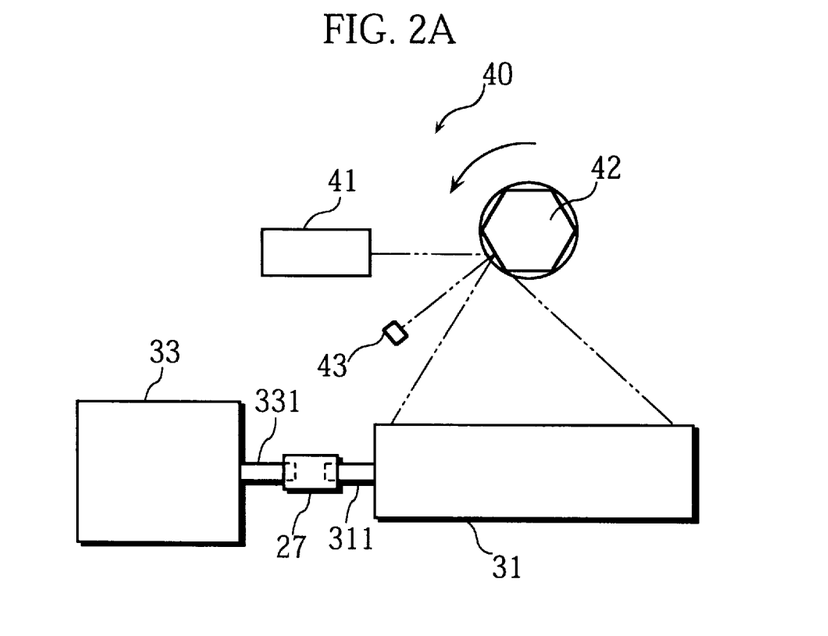
FIG. 2A shows a partial construction of an optical unit provided in the copying machine and also shows a connection state of a photosensitive drum and a stepping motor.
Figure 2B:
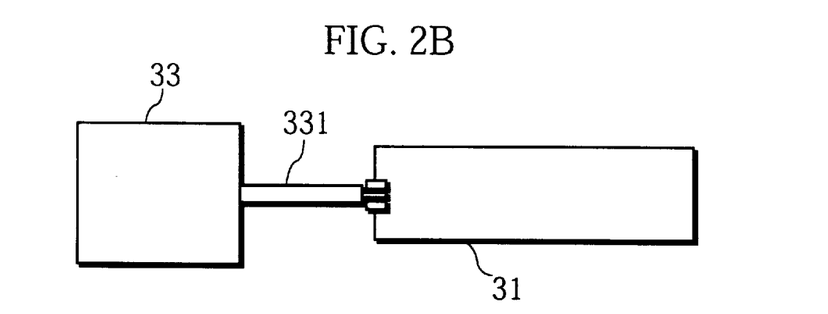
FIG. 2B shows an example of a connection state of the photosensitive drum and the stepping motor.
Figure 2C:
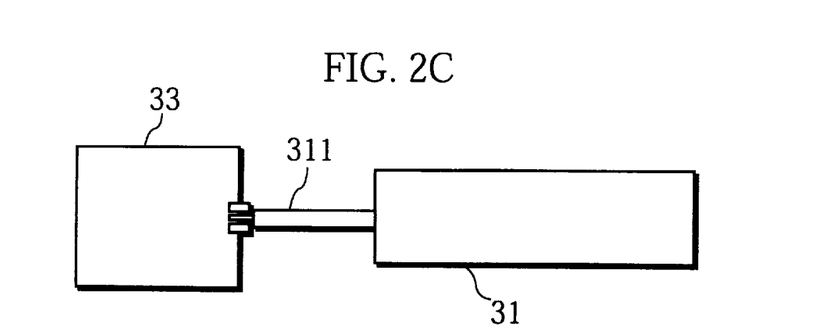
FIG. 2C shows an example of a connection state of the photosensitive drum and the stepping motor.
Figure 3:
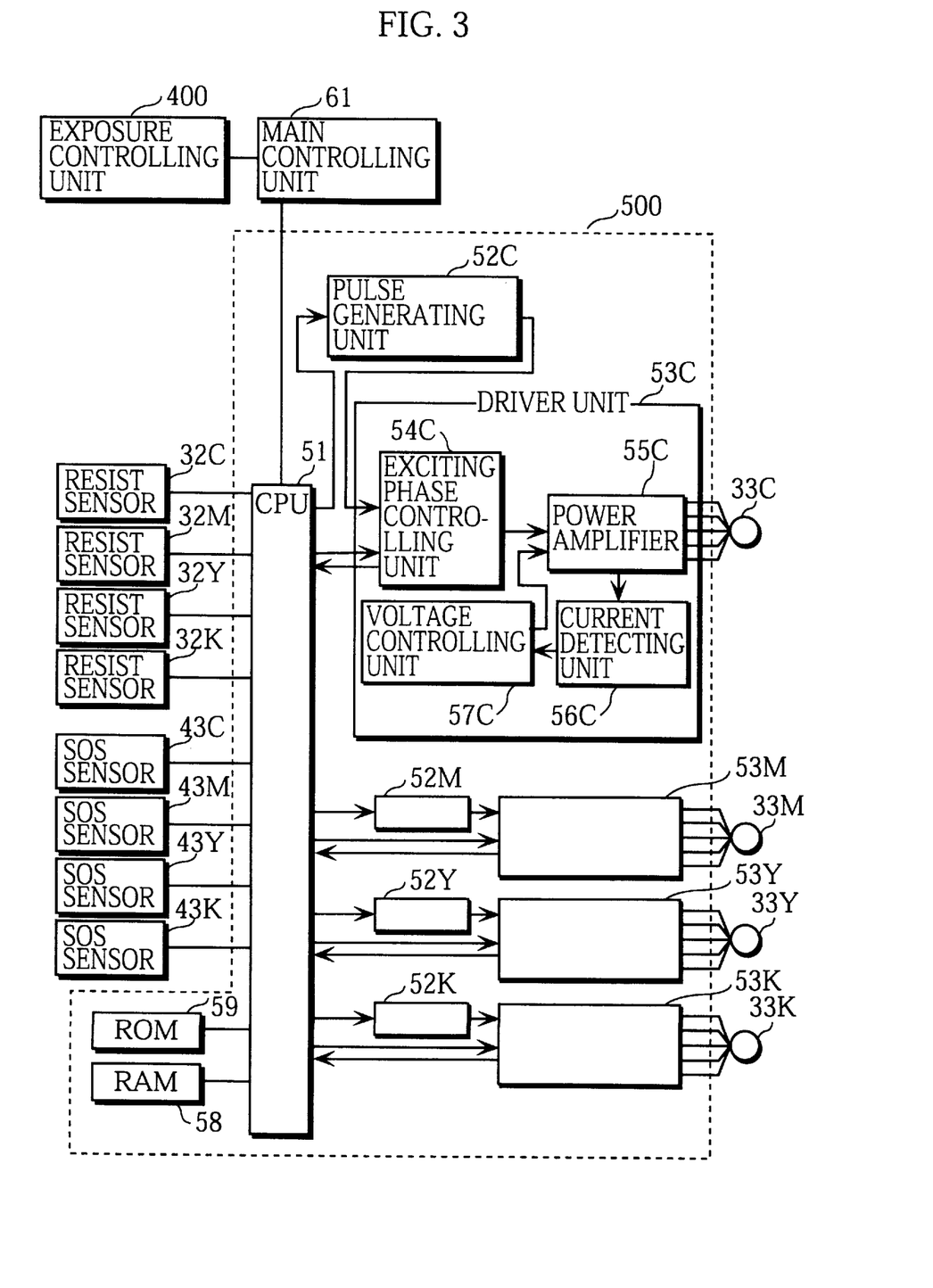
FIG. 3 is a block diagram mainly showing a construction of a drive controlling unit of the stepping motor.

The photosensitive drums 31C to 31K are respectively rotationally driven by stepping motors 33C to 33K (shown in FIG. 3). Hereinafter, when a construction or an operation is explained which is common to the components assigned numerals with the corresponding C, M, Y, and K, the explanation will be given using the numerals without C, M, Y, and K. FIG. 2A shows a connection state of the photosensitive drum 31 and the stepping motor 33. As shown in FIG. 2A, without a reducer or the like, a rotational shaft 331 of a rotor (not shown) of the stepping motor 33 is connected to a rotational shaft 311 of the photosensitive drum 31 approximately at the midpoint position between the photosensitive drum and the stepping motor using a coupling 27 which is a well-known shaft coupling. Note that a position where the photosensitive drum 31 and the stepping motor 33 are connected to each other is not limited to this midpoint position. For example, the position may be at one end of the photosensitive drum 31 as shown in FIG. 2B, or may be at one end of the stepping motor 33 as shown in FIG. 2C.

A five-phase stepping motor whose standard step angle is 0.16070° is used as the stepping motor 33. A diameter of the photosensitive drum 31 is 30.19 mm. Therefore, when the photosensitive drum 31 is made to rotate one step angle (i.e., the standard step angle), a moving distance of a peripheral surface of the photosensitive drum 31 in the sub-scanning direction as a result of one step rotation is 42.33μm (=30.19× π×0.1607/360). Note that π in the equation represents the circular constant. A resolution in the sub-scanning direction is set at 600 dpi. In this case, each distance between the scanning lines is 42.33μm (=25.4 mm(1 inch)/600), which is equal to the stated moving distance of the photosensitive drum 31.

More specifically, in the present invention, a relation among a step angle θ (°)of the stepping motor which rotates the photosensitive drum, a distance p (mm) between the scanning lines on the photosensitive drum, and a diameter d (mm) of the photosensitive drum is represented by the following equation.

$$\theta = (360 \cdot p)/(\pi \cdot d)$$

As shown in FIG. 2A, the optical unit 40 set above the photosensitive drum 31 has an SOS (Start of Scan) sensor 43 which includes a photo sensor. The laser beam is deflected one at a time on a face of a polygon mirror 42 which is in the shape of a regular polygon (hexagonal in FIG. 2A). The SOS sensor 43 is set so that the exposure starting positions of the scanning lines are aligned on the photosensitive drum 31 in the sub-scanning direction. More specifically, the SOS sensor 43 is set at the position as shown in FIG. 2A, at which the laser beam emitted from the laser diode 41 and deflected by a face of the polygon mirror 42 is received by the SOS sensor 43 before reaching the photosensitive drum 31. In synchronization with an SOS signal generated when the SOS sensor 43 receives the laser beam, the light modulation of the laser beam is started. The polygon mirror 42 is rotated by a motor (not shown) at a constant speed so that the generation cycle of the SOS signal is equivalent to the rotational cycle of the stepping motor for one step when the image formation is performed.

With the stated construction of the copier, the recording sheet S is supplied from the paper feeding cassette 11 by a pick-up roller 21 and a pair of take-up rollers 22, and further passes through pairs of intermediate rollers 23 and 24. The recording sheet S stops immediately before a pair of synchronizing rollers 25 which is not currently rotated, with the leading edge of the recording sheet S being in contact with the pair of synchronizing rollers 25. By means of the pair of synchronizing rollers 25 which is rotationally driven at a predetermined timing, the recording sheet S is carried to the transport belt 14. The toner images for C, M, Y, and K are then sequentially transferred onto the recording sheet S transported on the transport belt 14. After the image transfer, the recording sheet S is transported by the transport belt 14 to a fixing unit 26, where the transferred image is fixed, and is finally discharged onto the paper discharge tray 13.

FIG. 3 is a block diagram showing a drive controlling unit 500 which mainly performs the driving control of the stepping motors 33C to 33K.

As shown in FIG. 3, the drive controlling unit 500 includes a CPU 51 as a main component which is connected to a main controlling unit 61 for controlling the entire copier, pulse generating units 52C to 52K, driver units 53C to 53K, resist sensors 32C to 32K, SOS sensors 43C to 43K, a RAM 58, and a ROM 59. The CPU 51 performs controlling operations according to programs stored in the ROM 59. The main controlling unit 61 is connected to the image reading unit 15 (shown in FIG. 1), the image processing unit 16 (shown in FIG. 1), and an exposure controlling unit 400 for controlling the optical units 40C to 40K. The SOS sensors 43C to 43K are also connected to the exposure controlling unit 400.

The pulse generating unit 52 generates a clock pulse train having a cycle corresponding to a frequency indicated by the CPU 51. By changing the cycle of the clock pulse train, the rotational speed of the stepping motor 33 is variably controlled. Here, "the frequency of the clock pulse train" referred to in the present specification means the number of pulses per unit of time.

The driver units 53C to 53K respectively control the stepping motors 33C to 33K to rotate at the rotational speed corresponding to the frequency of the clock pulse train, in accordance with an exciting phase switching based on an exciting mode switching signal outputted from the CPU 51. Here, the exciting mode switching signal is used for indicating an exciting mode out of four-phase-on and four-and-five-phase-on to an exciting phase controlling unit (described later). Hereinafter, these exciting modes are respectively referred to as the "four-phase-on drive" and the "four-and-five-phase-on drive". The exciting phase controlling unit identifies these exciting modes by High and Low signals. More specifically, the CPU 51 outputs a High signal to indicate the four-phase-on drive, while outputting a Low signal to indicate the four-and-five-phase-on drive.

Each of the driver units 53C to 53K has the same construction, and therefore, only the driver unit 53C is described as one example.

The driver unit 53C is composed of an exciting phase controlling unit 54C, a power amplifier 55C, a current detecting unit 56C, and a voltage controlling unit 57C.

The exciting phase controlling unit 54C, which is a kind of a shift register, decreases the frequency of the clock pulse train in accordance with the exciting mode switching signal to generate a drive pulse train, and distributes the drive pulse train to exciting phases of the stepping motor 33C. More specifically, the stepping motor 33C rotates one step angle for each pulse of the drive pulse train. The exciting phase controlling unit 54C starts or stops the distribution of the drive pulse train in accordance with a start signal or a stop signal outputted from the CPU 51.

The power amplifier 55C amplifies the drive pulse train and passes a drive current through an exciting coil. The current detecting unit 56C detects a current value of the drive current, while the voltage controlling unit 57C controls the voltage applied to the exciting coil in accordance with the detected current value. Each of the power amplifier 55C, the current detecting unit 56C, and the voltage controlling unit 57C includes a well-known circuit.

When the four-phase-on drive is operational, the stepping motor 33 is made to rotate by a full-step angle, the step angle being the standard step angle (this drive mode is referred to as the "full-step drive" hereinafter). Meanwhile, when the four-and-five-phase-on drive is operational, the stepping motor is made to rotate by a half-step angle which is half of the full-step angle. In the present embodiment, the stepping motor 33 is made to rotate by the full-step angle in the four-phase-on drive.

The ROM 59 stores the number of steps to provide the timing of starting the exposure on the photosensitive drum 31 after the resist sensor 32 detects the leading edge of the recording sheet S transported on the transport belt 14 (shown in FIG. 1).

Figure 4:
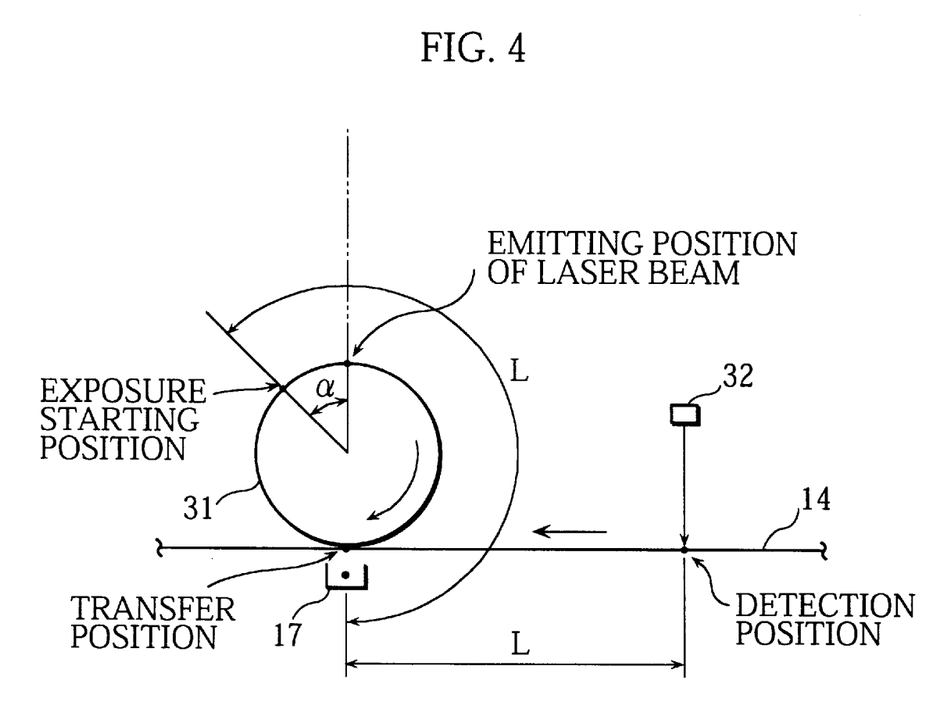
FIG. 4 is a drawing to help explain a start timing of exposure on the photosensitive drum.

As shown in FIG. 4, the distance between the detection position of the resist sensor 32 and the transfer position is referred to as "L". The moving speed of the transport belt 14 and the circumferential speed of the photosensitive drum 31 are set equal, as described above. Thus, on detection of the leading edge of the recording sheet S by the resist sensor 32, the exposure needs to be started from the position measured the distance "L" from the transfer position in the opposite direction of rotation of the photosensitive drum 31. More specifically, the exposure needs to be started after the photosensitive drum 31 is rotated the angle $\alpha$ from the detection of the leading edge of the recording sheet S. The number of steps "N" is obtained by dividing the angle $\alpha$ by the standard step angle (i.e., the step angle in the full-step drive) of the stepping motor 33, and is stored in the ROM 59. Diameters of the photosensitive drums 31C to 31K are the same and the respective distances between the transfer positions and the corresponding detection positions of the resist sensors 32C to 32K are set equal, so that the number of steps "N" stored in the ROM 59 is used in common.

Figure 5:
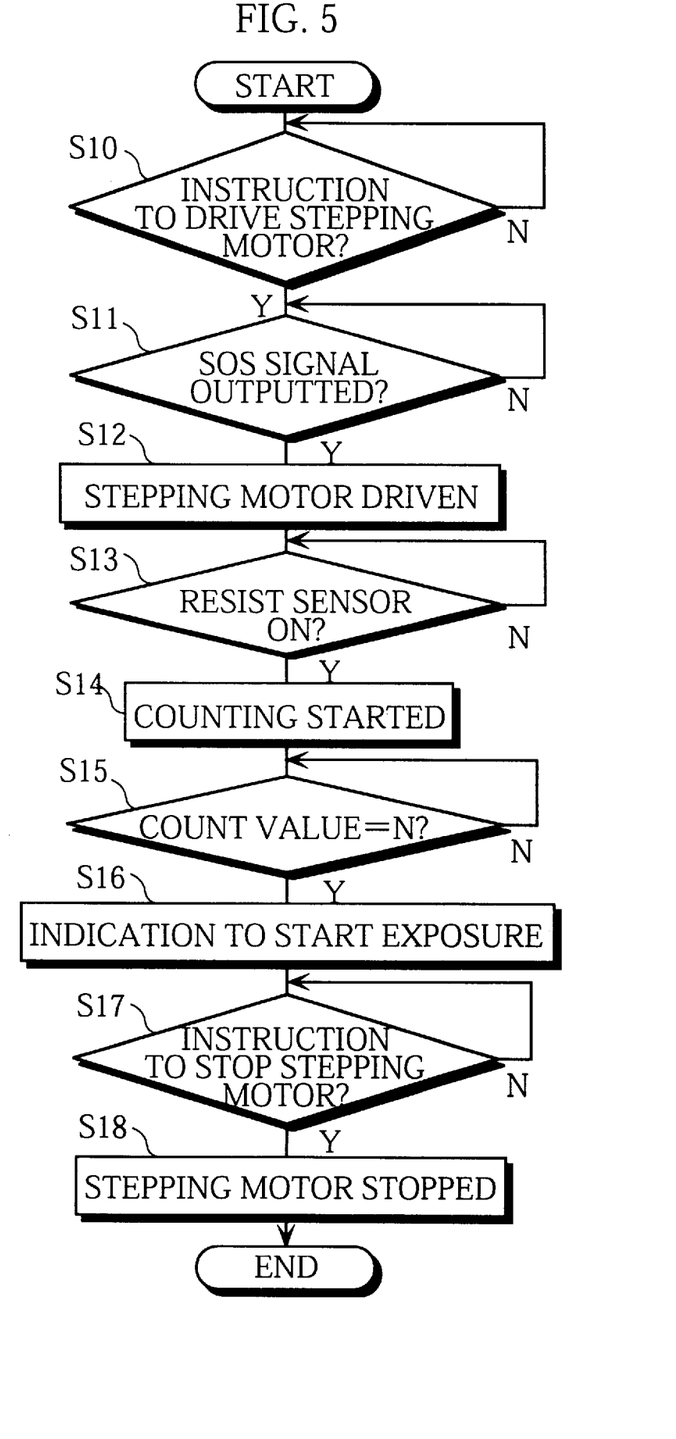
FIG. 5 is a flowchart showing the control of a driver unit mainly performed by a CPU of the drive controlling unit.

FIG. 5 is a flowchart showing the control of the driver unit 53 performed by the CPU 51. Note that the controls of the driver units 53C to 53K are the same, and therefore, the explanation is given only for the driver unit 53C as one example.

On receiving an instruction from the main controlling unit 61 to drive the stepping motor 33C ("Yes" in step S10), the CPU 51 waits for an SOS signal outputted from the SOS sensor 43C (step S11). Note that when the main controlling unit 61 indicates to drive the stepping motor 33C, the polygon mirror 42C has been rotated at the constant speed.

When the SOS signal is outputted from the SOS sensor 43C ("Yes" in step S11), the CPU 51 has the stepping motor 33C driven and rotated at the process speed (step S12). More specifically, the CPU 51 instructs the pulse generating unit 52C to generate the clock pulse train of a certain cycle, as well as outputting a drive signal for driving the stepping motor 33C and an exciting mode switching signal of High to the exciting phase controlling unit 54C of the driver unit 53C. The stepping motor 33C is driven in synchronization with a timing at which the SOS signal is outputted, so that the relationship between the starting timing of latent image formation for one scanning line and the starting timing of the one rotation of the stepping motor 33C for one step angle is always constant. As a result, each scanning line of the latent image formed on the photosensitive drums 31C to 31K is the same in form. This ensures a better quality of a reproduced image. When the rotational speed of the stepping motor 33 corresponding to the process speed is not within a self-activation range, the stepping motor 33 needs to be activated using a slow-up operation. In this case, the stepping motor 33 is driven so that the input timing of the SOS signal synchronizes with the drive timing for each step (that is, a switching timing of exciting phases) when the rotational speed of the stepping motor reaches the process speed.

When the resist sensor 32C detects the leading edge of the recording sheet S transported on the transport belt 14 ("Yes" in step S13), the CPU 51 starts counting the number of pulses of the drive pulse train using an internal counter (step S14).

When the count value of the internal counter reaches N ("Yes" in step S15), the CPU 51 outputs a signal indicating to start the exposure on the photosensitive drum 31C to the main controlling unit 61 (step S16). Receiving the signal, the main controlling unit 61 controls the exposure controlling unit 400 to start the exposure on the photosensitive drum 31C.

Then, the CPU 51 waits for an instruction from the main controlling unit 61 to stop the stepping motor 33C (step S17). When receiving the instruction ("Yes" in step S17), the CPU 51 has the pulse generating unit 52C stop the generation of the clock pulse train, and outputs a stop signal to the exciting phase controlling unit 54C to have the stepping motor 33C stopped (step S18).

Using the image forming apparatus of the present embodiment described above, the photosensitive drum is directly driven by the stepping motor and one scanning line of the electrostatic latent image is formed every time the stepping motor rotates one step angle. Consequently, conventional problems are prevented from occurring, such as nonuniformity in the distances between the scanning lines caused by nonuniform rotation that is in turn caused by the reducer set between the photosensitive drum and the stepping motor and nonuniformity in distances between the scanning lines caused by the existence of a plurality of scanning lines in one step of the stepping motor. Accordingly, a better quality of a reproduced image is ensured.

One scanning line of the latent image is formed every time the stepping motor rotates one step, so that the position of the image to be reproduced on the recording sheet S can be adjusted in the sub-scanning direction in a unit of one scanning line (i.e., in a resolution level) by changing the number of steps "N". Accordingly, when color displacements occur to the reproduced image, a modification can be easily performed by adjusting the number of steps "N" for each photosensitive drum if necessary.

In the present embodiment, the photosensitive drum is scanned by one scanning line every time the stepping motor rotates one step angle. However, the number of step angles rotated by the stepping motor is not limited to one, and photosensitive drum may be scanned by one scanning line every time the stepping motor rotates a plurality of step angles.

More specifically, in the present invention, the relation among the step angle θ (°) of the stepping motor which rotates the photosensitive drum, the distance p (mm) between the scanning lines on the photosensitive drum, and the diameter d (mm) of the photosensitive drum may be represented by the following equation, and the photosensitive drum may be scanned by one scanning line every time the stepping motor rotates n step angles. By doing so, the same effect stated above is obtained. Note that "n" is a positive integer.

$$n \cdot \theta = (360 \cdot p)/(\pi \cdot d)$$

A copier is described as the present invention in the stated embodiment. However, the present invention can be used for an image forming apparatus, such as a laser printer and a facsimile, which has a photosensitive drum.

Although the present invention has been fully described by way of examples with reference to the accompanying drawings, it is to be noted that various changes and modifications will be apparent to those skilled in the art.

Therefore, unless such changes and modifications depart from the scope of the present invention, they should be constructed as being included therein.

What is claimed is:

1. An image forming apparatus comprising:

a photosensitive drum;

a stepping motor for directly driving and rotating the photosensitive drum; and an optical unit for scanning the photosensitive drum, which is rotated by the stepping motor, one scanning line at a time using an optical beam to form a latent image on the photosensitive drum, wherein θ (°) indicating a step angle of the stepping motor, p (mm) indicating a distance between scanning lines on the photosensitive drum, and d (mm) indicating a diameter of the photosensitive drum are set so as to satisfy a following equation to make the optical unit scan the photosensitive drum by one scanning line every time the photosensitive drum is rotated n steps by the stepping motor, n being a positive integer: $n \cdot \theta = (360 \cdot p)/(\pi \cdot d)$.

2. The image forming apparatus of claim 1, wherein n is one.

3. The image forming apparatus of claim 1 further comprising at least one set, each set including the photosensitive drum, the stepping motor, and the optical unit, wherein a color image is formed by superimposing images formed in different colors by each set.

4. An image forming apparatus comprising:

an image holding member which is rotatable;

a driving source which is directly connected to a rotational shaft of the image holding member to rotationally drive the image holding member; and an optical unit for scanning the image holding member, which is rotated by the driving source, one scanning line at a time using an optical beam to form a latent image on the image holding member, wherein θ (°) indicating a unit moving angle of the driving source, p (mm) indicating a distance between scanning lines on the image holding member, and d (mm) indicating a diameter of the image holding member are set so as to satisfy a following equation to make the optical unit scan the image holding member by one scanning line every time the image holding member is rotated in units of n by the driving source, n being a positive integer: $n \cdot \theta = (360 \cdot p)/(\pi \cdot d)$.

5. The image forming apparatus of claim 4, wherein n is one.

6. The image forming apparatus of claim 4 further comprising at least one set, each set including the image holding member, the driving source, and the optical unit, wherein a color image is formed by superimposing images formed in different colors by each set.

7. An image forming apparatus comprising:

a photosensitive member;

a stepping motor for directly driving and rotating the photosensitive member; and an optical unit for scanning the photosensitive member, which is being rotated by the stepping motor, with light to form a latent image on the photosensitive member, wherein $\theta$ (°) indicating a step angle of the stepping motor, p (mm) indicating a distance between scanning lines on the photosensitive member, and d (mm) indicating a diameter of the photosensitive member are set so as to satisfy $n \cdot \theta = (360 \cdot p)/(\pi \cdot d)$, to make the optical unit start scanning of the photosensitive member every time the photosensitive member is rotated n steps by the stepping motor, with n being a positive integer.

8. The image forming apparatus of claim 7, wherein n is one.

9. The image forming apparatus of claim 7, further comprising at least one set, each set including the photosensitive member, the stepping motor, and the optical unit, wherein a color image is formed by superimposing images formed in different colors by each set.

10. An image forming apparatus comprising:

an image holding member;

a stepping motor for directly driving and rotating the image holding member; and an image writer for writing an image on the image holding member by scanning the image holding member being rotated by the stepping motor, wherein $\theta$ (°) indicating a step angle of the stepping motor, p (mm) indicating a distance between scanning lines on the image holding member, and d (mm) indicating a diameter of the image holding member are set so as to satisfy $n \cdot \theta = (360 \cdot p)/(\pi \cdot d)$, to make the image writer start scanning of the image holding member every time the image holding member is rotated n steps by the stepping motor, with n being a positive integer.

11. The image forming apparatus of claim 10, wherein n is one.

12. The image forming apparatus of claim 10, further comprising at least one set, each set including the image holding member, the stepping motor, and the image writer, wherein a color image is formed by superimposing images formed in different colors by each set.

* * * * *